(12) United States Patent
Epp

(10) Patent No.: US 11,917,942 B2
(45) Date of Patent: Mar. 5, 2024

(54) MOWER WITH ROLLER CONDITIONER

(71) Applicant: CLAAS Saulgau GmbH, Bad Saulgau (DE)

(72) Inventor: Siegfried Epp, Eberhardzell (DE)

(73) Assignee: CLAAS Saulgau GmbH, Bad Saulgau (DE)

(*) Notice: Subject to any disclaimer, the term of this patent is extended or adjusted under 35 U.S.C. 154(b) by 0 days.

(21) Appl. No.: 17/481,192

(22) Filed: Sep. 21, 2021

(65) Prior Publication Data
US 2022/0087102 A1  Mar. 24, 2022

(30) Foreign Application Priority Data
Sep. 24, 2020 (DE) .......................... 102020124992.6

(51) Int. Cl.
  *A01D 43/10* (2006.01)
  *A01D 69/06* (2006.01)
  *A01D 82/02* (2006.01)

(52) U.S. Cl.
  CPC ......... *A01D 43/105* (2013.01); *A01D 43/107* (2013.01); *A01D 69/06* (2013.01); *A01D 82/02* (2013.01)

(58) Field of Classification Search
  CPC .... A01D 43/105; A01D 43/107; A01D 82/02; A01D 69/06
  See application file for complete search history.

(56) References Cited

U.S. PATENT DOCUMENTS

| 4,035,991 A | 7/1977 | Oosterling et al. |
| 4,127,981 A * | 12/1978 | Parrish ................. A01D 43/105 56/14.4 |
| 4,949,535 A * | 8/1990 | Hurlburt .............. A01D 43/107 100/168 |

(Continued)

FOREIGN PATENT DOCUMENTS

| DE | 2606476 A1 | 9/1976 |
| EP | 0286826 A1 | 10/1988 |
| WO | 2012097114 A1 | 7/2012 |

OTHER PUBLICATIONS

German Patent Office Search Report; 5 pages; dated Jun. 16, 2021.
(Continued)

*Primary Examiner* — Thomas B Will
*Assistant Examiner* — Julia C Tran

(57) ABSTRACT

Mower (1), has a plurality of mowing elements (2), forming a mower bar (3), a roller conditioner (4), behind the mower bar (3), and an upper conditioning roller (5) and a lower conditioning roller (6), the lower conditioning roller (6) is rotatable about a lower, positionally fixed axis of rotation (8), wherein the upper conditioning roller (5) is rotatable about an upper, shiftable axis of rotation (9) that, as a result of shifting the upper axis of rotation (9), a gap (7) between the conditioning rollers (5, 6) is changeable, wherein the lower conditioning roller (6) and the upper conditioning roller (5) are coupled to each other via a scissors-like transmission (10), and wherein first and second transmission parts (11,12) are coupled to the lower conditioning roller (6) and the upper conditioning roller (5) respectively and are operatively connected to each other and are shiftable in a scissors-like manner.

13 Claims, 2 Drawing Sheets

(56) References Cited

U.S. PATENT DOCUMENTS

| | | | | |
|---|---|---|---|---|
| 4,961,303 A | * | 10/1990 | McCarty | A01D 82/00 |
| | | | | 100/169 |
| 5,435,239 A | * | 7/1995 | Talbot | A01D 82/02 |
| | | | | 99/523 |
| 5,992,133 A | * | 11/1999 | Walch | A01D 43/105 |
| | | | | 56/192 |
| 6,220,007 B1 | | 4/2001 | Doerr et al. | |
| 7,958,708 B2 | * | 6/2011 | Nickel | A01D 43/102 |
| | | | | 56/16.4 C |
| 2006/0123759 A1 | | 6/2006 | Fox et al. | |
| 2015/0052866 A1 | | 2/2015 | Walch | |

OTHER PUBLICATIONS

Extended European search report from the European Patent Office; 7 pp.; dated Feb. 10, 2022; Machine translation provided.

* cited by examiner

MOWER WITH ROLLER CONDITIONER

The invention relates to a mower according to the preamble of claim 1.

EP 0 286 826 A1 discloses a mower having a roller conditioner. The mower has a plurality of mowing elements which are positioned next to one another forming a mower bar. The roller conditioner of the mower has a lower and an upper conditioning roller. The lower conditioning roller is rotatable about a positionally fixed axis of rotation. The upper conditioning roller is rotatable about an axis of rotation which is vertically movable and accordingly shiftable. This makes it possible for the size of a gap which is defined between the two conditioning rollers and through which the mowed crop is conveyed and conditioned as it is being conveyed therethrough to be changed. During the conditioning, plant parts, such as leaves or stalks, are in particular repeatedly crushed, as a result of which the drying time of the crop is shortened. According to EP 0 286 826 A1, the two conditioning rollers are driven by a power take-off transmission via power take-off shafts. Thus, a lower power take-off shaft acts on the lower conditioning roller and an upper power take-off shaft acts on the upper conditioning roller, said power take-off shafts being driven by the power take-off transmission. The use of a power take-off transmission with such power take-off shafts for driving the two conditioning rollers of the roller conditioner has the disadvantage that a relatively long constructional form of the mower is required, as seen in the axial direction of the conditioning rollers, namely because of the construction space required for the power take-off shafts. There is a need to reliably drive the two conditioning rollers of the roller conditioner of a mower with little construction space being required.

Taking this as the starting point, the present invention is based on the object of creating a novel mower. This object is achieved by a mower according to claim 1. According to the invention, the lower conditioning roller and the upper conditioning roller are coupled to each other via a scissors-like transmission, wherein a first transmission part is coupled to the lower conditioning roller and a second transmission part is coupled to the upper conditioning roller, and wherein the transmission parts are operatively connected to each other and are shiftable in a scissors-like manner with respect to each other.

By means of the scissors-like transmission with the two transmission parts which are shiftable in a scissors-like manner with respect to each other, a reliable drive connection can be ensured between the two conditioning rollers with little construction space being required.

According to an advantageous development, the first transmission part has a first number of intermeshing gear wheels, and the second transmission part has a second number of intermeshing gear wheels that differs from the first number by one, wherein the first number of gear wheels of the first transmission part is preferably greater by one than the second number of gear wheels of the second transmission part. Particularly preferably, the first transmission part has four gear wheels and the second transmission part has three gear wheels. This is preferred in order to reliably drive the upper, vertically movably mounted conditioning roller with little construction space being required.

According to an advantageous development, a first gear wheel of the first transmission part is coupled to the axis of rotation of the lower conditioning roller for rotation therewith, wherein a first gear wheel of the second transmission part is coupled to the axis of rotation of the upper conditioning roller for rotation therewith, and wherein a second gear wheel of the first transmission part and a second gear wheel of the second transmission part are arranged on a shiftable scissors axis and the two gear wheels rotate together with the scissors axis at the same rotational speed and in the same direction of rotation. This also serves for reliably driving the upper conditioning roller with little construction space being required.

According to an advantageous development, the first transmission part is arranged between the conditioning rollers and the second transmission part, as seen in the axial direction of the conditioning rollers. Preferably, the second transmission part is coupled to the axis of rotation of the upper conditioning roller via an articulated coupling for rotation therewith, said articulated coupling being arranged between the conditioning rollers and the second transmission part, as seen in the axial direction of the conditioning rollers, and in front of the first transmission part in the material flow direction of the conditioning rollers. The requirement for construction space can also be hereby further reduced. Even in the event of angular shifting of the upper conditioning roller, the articulated coupling permits reliable driving thereof via the scissors-like transmission. For example, a universal joint coupling, a claw coupling or a constant velocity joint can be provided as the angularly movable coupling.

Preferred developments of the invention emerge from the dependent claims and the description below. Exemplary embodiments of the invention, without being restricted thereto, will be explained in more detail with reference to the drawing, in which:

Figure 1:
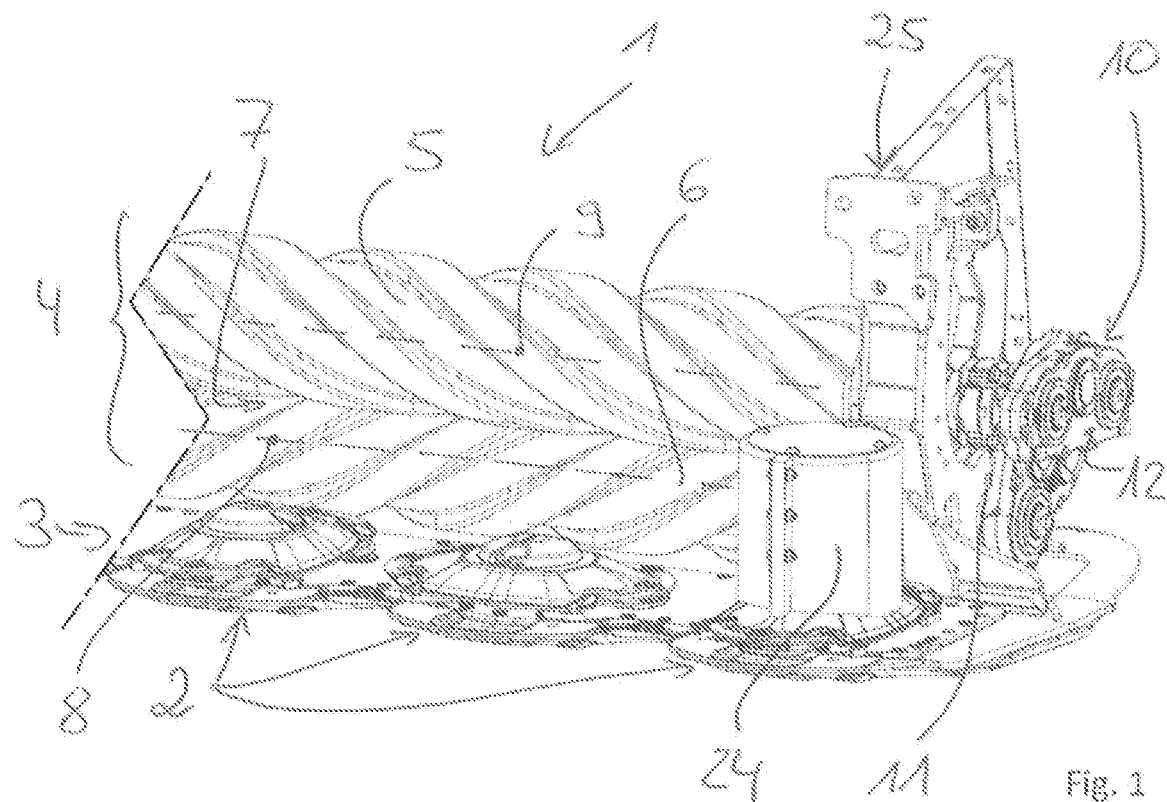
FIG. 1 shows a cutout from a mower according to the invention in a perspective view from the front and top.

The invention present here relates to a mower 1. FIG. 1 shows a cutout from a mower 1 which has a plurality of mowing elements 2. The mowing elements 2 are positioned next to one another forming a mower bar 3. In the exemplary embodiment shown, the mowing elements 2 are mowing disks, and therefore the mower 1 is accordingly designed as a disk mower. The invention can also be used in the case of other mowers, for example drum mowers.

The mower 1 furthermore has a roller conditioner 4, which is arranged behind the mower bar 3 in the material flow direction of mowed crop, wherein the roller conditioner 4 has an upper conditioning roller 5 and a lower conditioning roller 6. The upper conditioning roller 5 and the lower conditioning roller 6 define a gap 7, wherein mowed crop is conveyed through the gap 7 and is conditioned as it is conveyed therethrough by plant parts, such as leaves or stalks, in particular being repeatedly crushed in order to shorten the drying time of the crop.

The lower conditioning roller 6 is mounted rotatably about a lower axis of rotation 8 which is positionally fixed. The upper conditioning roller 5 is mounted rotatably about an upper axis of rotation 9 which is shiftable relative to the lower axis of rotation 8 in order to change the gap 7 between the conditioning rollers 5, 6. In order to increase the gap 7, the axis of rotation 9 of the upper conditioning roller 5 is moved away from the axis of rotation 8 of the lower conditioning roller 6; in order to reduce the gap 7, the axis of rotation 9 is moved in the direction of the axis of rotation 8.

Figure 3:
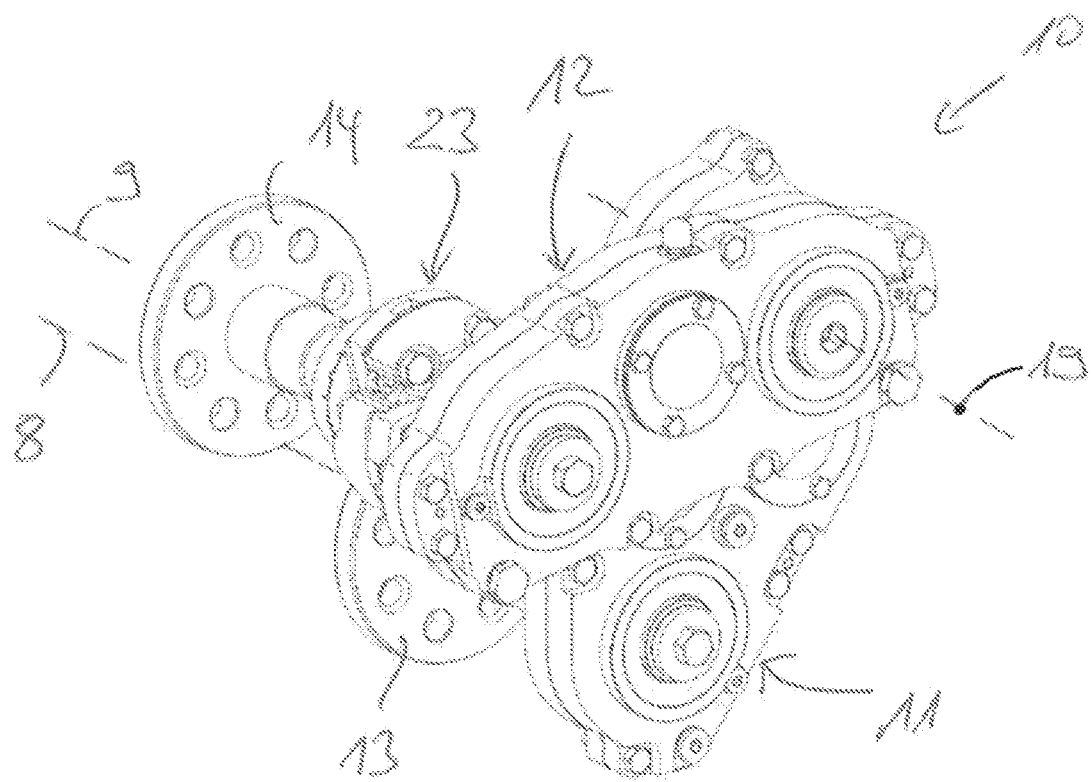
FIG. 3 shows a detail of FIG. 2 from a second side.
Figure 4:
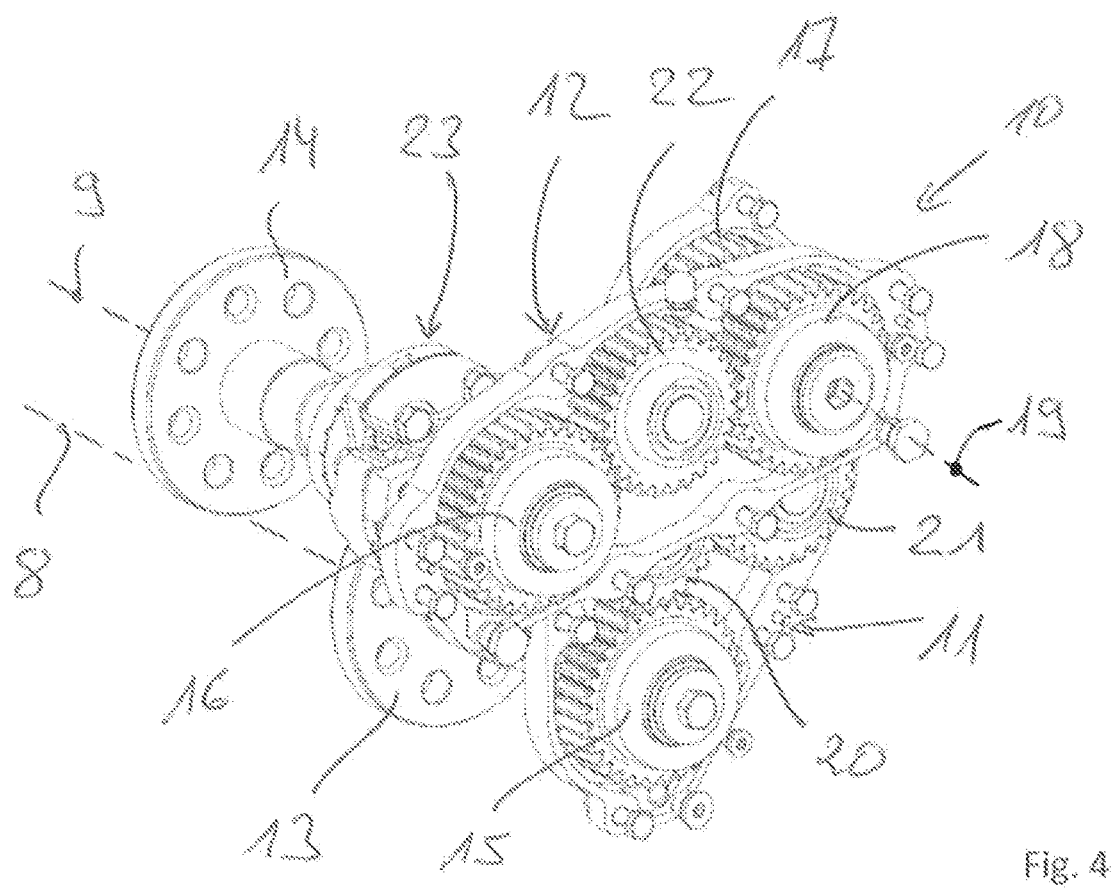
FIG. 4 shows the detail of FIGS. 2 and 3 from the second side with housing coverings removed.

The lower conditioning roller 6, which is rotatable about the positionally fixed axis of rotation 8, is driven by a drive which is coupled to the other end, not illustrated, of the lower conditioning roller 6 and which is not visible in FIG. 1. In order also to drive the upper conditioning roller 5, the roller conditioner 4 has a transmission 10 which is shown in a separate illustration in FIGS. 2, 3 and 4.

The transmission 10 is a scissors-like transmission via which the lower conditioning roller 6 is coupled to the upper conditioning roller 5 in order to drive the upper conditioning roller 5 from the lower conditioning roller 6. The transmission 10 is arranged axially laterally next to the conditioning rollers 5, 6 and to a housing portion 25 of the mower 1.

The scissors-like transmission 10 has two transmission parts 11, 12. The lower conditioning roller 6 is coupled here to a first transmission part 11, specifically via a flange 13. The upper conditioning roller 5 is coupled to a second transmission part 12, specifically via a flange 14.

The first transmission part 11 has a first gear wheel 15 (FIG. 4) which is coupled to the axis of rotation 8, about which the lower conditioning roller 6 is rotatably mounted, for rotation therewith. The second transmission section 12 likewise has a first gear wheel 16, which is coupled to the axis of rotation 9, about which the upper conditioning roller 5 is rotatably mounted, for rotation therewith.

The two transmission parts 11 and 12 furthermore have a respective second gear wheel 17, 18, namely the first transmission part 11 has the second gear wheel 17 and the second transmission part 12 has the second gear wheel 18, which gear wheels are both arranged consecutively together on an intermediate shaft, which defines a scissors axis 19, specifically in such a manner that the two gear wheels 17, 18 rotate at the same rotational speed and in the same direction of rotation.

In the exemplary embodiment shown, the two gear wheels 20, 21 are connected between the first gear wheel 15 and the second gear wheel 17 of the first transmission part 11 in such a manner that the gear wheel 20 meshes in the gear wheel 15 and the gear wheel 21 in the gear wheels 20 and 17. In the region of the second transmission part 12, a single further gear wheel 22 is connected between the first gear wheel 16 and the second gear wheel 18 and meshes in the gear wheels 16, 18.

It is ensured by means of the selected number and arrangement of the gear wheels 15, 16, 17, 18, 20, 21 and 22 of the two transmission parts 11, 12 of the scissors-like transmission 10 that, when the lower conditioning roller 6 rotates in a defined direction of rotation, the upper conditioning roller 5 rotates in an opposite direction of rotation in order to safely and reliably convey mowed crop through the gap 7 defined between the two conditioning rollers 5 and 6.

The first transmission part 11 accordingly has a first number of intermeshing gear wheels 15, 20, 21 and 17, wherein the second transmission part 12 has a second number of intermeshing gear wheels 16, 22 and 18, wherein the two numbers of gear wheels of the two transmission parts 11, 12 differ from each other in such a manner that the first number of gear wheels of the first transmission part 11 is greater than the second number of gear wheels of the second transmission part 12, specifically in such a manner that the first number of gear wheels of the first transmission part 11 is greater by 1 than the second number of gear wheels of the second transmission part 12. In the exemplary embodiment shown, the first transmission part 11 comprises four gear wheels and the second transmission part 12 three gear wheels.

Irrespective of this specific embodiment, one of the two transmission parts 11, 12 has to have one gear wheel more than the other in order to reverse the direction of rotation.

The scissors-like transmission 10 is connected in the region of the first gear wheel 15 of the first transmission part 11 in a positionally fixed manner to the positionally fixed axis of rotation 8 of the lower conditioning roller 6. The other gear wheels of the two transmission parts 11, 12 of the scissors-like transmission 10 are shiftable, specifically the first gear wheel 16 of the second transmission part 12 together with the axis of rotation 9 of the upper conditioning roller 5 and the two second gear wheels 17, 18 of the two transmission parts 11, 12 together with the shiftable scissors axis 19.

It is preferred to arrange the first transmission part 11 between the conditioning rollers 5, 6 and the second transmission part 12, as seen in the axial direction of the conditioning rollers 5, 6. This is of advantage for a particularly compact constructional form.

The first transmission part 11 preferably extends upwards and rearwards from the first gear wheel 15, and therefore from the axis of rotation 8 of the lower conditioning roller 6, as seen in the material flow direction of the mowed crop, in the direction of the scissors axis 9.

The second transmission part 12 preferably extends from the scissors axis 19 in the direction of the axis of rotation 9 of the upper conditioning roller 5, specifically substantially horizontally or in a horizontal direction.

As illustrated in FIG. 1, the scissors axis 19 preferably lies behind the axes of rotation 8, 9 of the conditioning rollers 5, 6, as seen in the material flow direction, and therefore the transmission parts 11, 12 use the available construction space advantageously.

However, it is also possible to arrange the scissors axis 19 in front of the axes of rotation 8, 9, as seen in the material flow direction.

Figure 2:
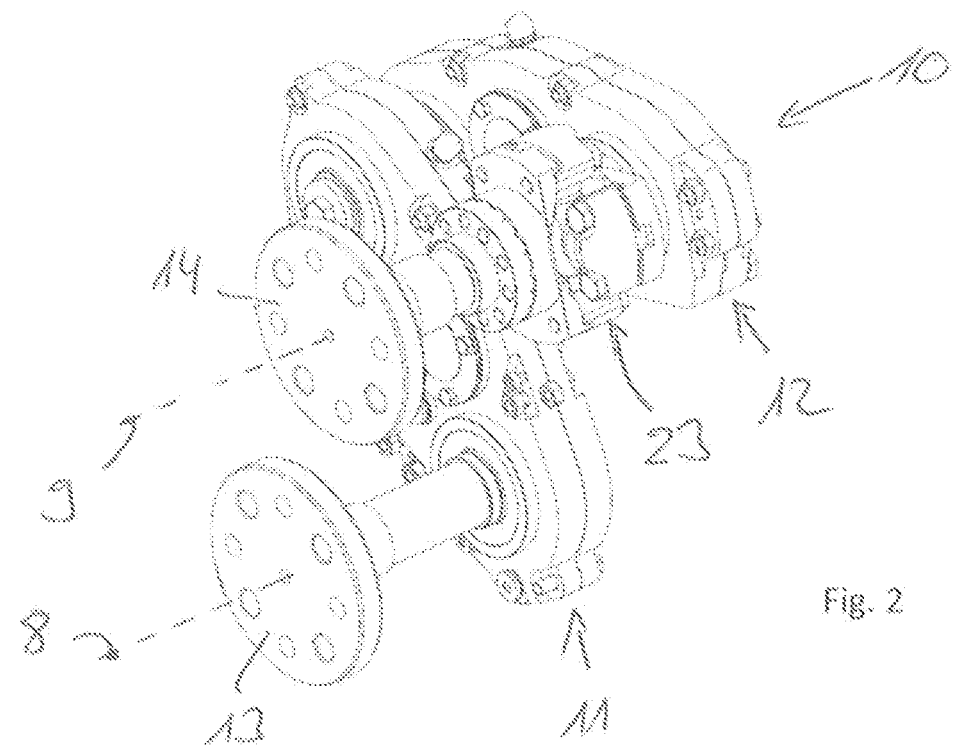
FIG. 2 shows a detail of FIG. 1 from a first side.

As can best be gathered from FIG. 2, the second transmission part 12 acts on the axis of rotation 9 of the upper conditioning roller 5 with the intermediate arrangement of an articulated coupling 23. This is of advantage in order to compensate for a possibly arising angular offset as a result of the upper conditioning roller 5 shifting relative to the lower conditioning roller 6. The articulated coupling 23 is arranged between the conditioning rollers 5, 6 and the second transmission part 12, as seen in the axial direction of the conditioning rollers 5, 6. The articulated coupling 23 is arranged in front of the first transmission part 11, as seen in the material flow direction, in a manner overlapping at least in sections in the axial direction with the first transmission part 11. The transmission parts 11, 12 have to be configured in such a manner that the conditioning rollers 5, 6 can be moved with respect to each other to an extent in order to completely close the gap 7, with sufficient construction space still remaining free so that the articulated coupling 23 can freely rotate.

The two transmission parts 11, 12 are components which are closed per se and which are each surrounded by a dedicated housing and are coupled to each other via an intermediate shaft, which defines the scissors axis 19. The advantageous coupling by means of the intermediate shaft enables the transmission parts 11, 12 to be shifted in a scissors-like manner with respect to each other, and the housings of the two transmission parts 11, 12 can be advantageously sealed at the coupling point in a simple manner by radial shaft sealing rings.

Since the transmission 10 or the respective transmission parts 11, 12 is/are mounted exclusively on the flanges 14—i.e. on the extensions of the axes of rotation 8, 9 of the conditioning rollers 5, 6, the scissors axis 19 can move freely in a plane running orthogonally with respect to the scissors axis 19. Furthermore, holders for fastening the transmission 10 advantageously do not have to be provided.

In the described exemplary embodiments, gear wheels are exclusively provided. However, it is also possible to realize individual or all drive connections by toothed belts or chains, with the required reversal of the direction of rotation having to be maintained.

In the case of the mower 1 according to the invention, the two conditioning rollers 5 and 6 can be reliably driven, specifically with a minimum requirement for construction space for the scissors-like transmission 10. The latter, as seen in the axial direction, has a width of at maximum 300 millimeters (mm), in particular a width of between 250 mm and 300 mm, such that only a relatively small construction space for the arrangement of the transmission 10 is required axially laterally next to the conditioning rollers 5 and 6. It is therefore sufficient if only the respectively outermost cutting element 2 is assigned a conveying element 24, which rotates together with the cutting element 2, for crop, said conveying element being designed as a conveying drum and conveying the crop inwards to the intake region of the conditioning rollers 5, 6.

According to FIG. 1, the two conditioning rollers 5, 6 are helically contoured or profiled on their outer circumference and intermesh in a form-fitting manner via said helical contours.

The conditioning rollers 5, 6 can be manufactured from plastic, for example PU or else from a metallic material, for example steel.

However, the contouring and the material of the conditioning rollers 5, 6 do not have any influence on the invention and accordingly may differ from the illustrated and described exemplary embodiment.

LIST OF REFERENCE SIGNS

1 Mower
2 Mowing element
3 Mower bar
4 Roller conditioner
5 Conditioning roller
6 Conditioning roller
7 Gap
8 Axis of rotation
9 Axis of rotation
10 Transmission
11 Transmission part
12 Transmission part
13 Flange
14 Flange
15 Gear wheel
16 Gear wheel
17 Gear wheel
18 Gear wheel
19 Scissors axis
20 Gear wheel
21 Gear wheel
22 Gear wheel
23 Articulated coupling
24 Conveying element
25 Housing portion

The invention claimed is:

1. A mower (1) comprising:
a plurality of mowing elements (2), which are positioned next to one another forming a mower bar (3),
a roller conditioner (4), which is arranged behind the mower bar (3), as seen in the material flow direction of mowed crop, and which has an upper conditioning roller (5) and a lower conditioning roller (6),
wherein the lower conditioning roller (6) is rotatable about a lower, positionally fixed axis of rotation (8),
wherein the upper conditioning roller (5) is rotatable about an upper, shiftable axis of rotation (9) in such a manner that, as a result of shifting the upper axis of rotation (9) relative to the lower axis of rotation (8), a gap (7) between the conditioning rollers (5, 6) is changeable,
characterized in that
the lower conditioning roller (6) and the upper conditioning roller (5) are coupled to each other via a scissors-like transmission (10), wherein a first transmission part (11) is coupled only to the lower conditioning roller (6) and a second transmission part (12), and the second transmission part (12) is coupled only to the upper conditioning roller (5) and the first transmission part (11), wherein the transmission parts (11,12) are operatively connected to each other with an intermediate shaft and are shiftable in a scissors-like manner with respect to each other, the intermediate shaft having a scissors axis (19) that is movable within a plane orthogonal to the scissors axis (19).

2. The mower according to claim 1, characterized in that the first transmission part (11) has a first number of intermeshing gear wheels (15, 20, 21, 17),
the second transmission part (12) has a second number of intermeshing gear wheels (16, 22,18) that differs from the first number by one.

3. The mower according to claim 2, characterized in that the first number of gear wheels of the first transmission part (11) is greater by one than the second number of gear wheels of the second transmission part (12).

4. The mower according to claim 3, characterized in that the first transmission part (11) has four gear wheels and the second transmission part (12) has three gear wheels.

5. The mower according to claim 1, characterized in that a first gear wheel (15) of the first transmission part (11) is coupled to the axis of rotation (8) of the lower conditioning roller (6) for rotation therewith,
a first gear wheel (16) of the second transmission part (12) is coupled to the axis of rotation (9) of the upper conditioning roller (5) for rotation therewith,
a second gear wheel (17) of the first transmission part (11) and a second gear wheel (18) of the second transmission part (12) are arranged on a shiftable scissors axis (19) and the two gear wheels rotate together with the scissors axis (19) at the same rotational speed and in the same direction of rotation.

6. The mower according to claim 5, characterized in that the first transmission part (11) extends obliquely upwards and rearwards from the axis of rotation (8) of the lower conditioning roller (6) in the direction of the scissors axis (19), and in that the second transmission part (12) extends forwards from the scissors axis (19) in the direction of the axis of rotation (9) of the upper conditioning roller (5).

7. The mower according to claim 1, characterized in that the first transmission part (11) is arranged between the conditioning rollers (5, 6) and the second transmission part (12), as seen in the axial direction of the conditioning rollers (5, 6).

8. The mower according to claim 1, characterized in that the second transmission part (12) is coupled via an articulated coupling (23) to the axis of rotation (9) of the upper conditioning roller (5) for rotation therewith.

9. The mower according to claim 8, characterized in that the articulated coupling (23) is arranged between the conditioning rollers (5, 6) and the second transmission part (12), as seen in the axial direction of the conditioning rollers (5, 6).

10. The mower according to claim 9, characterized in that the articulated coupling (23) is arranged in front of the first transmission part (11), as seen in the material flow direction.

11. A mower (1) comprising:
- a plurality of mowing elements (2), which are positioned next to one another forming a mower bar (3),
- a roller conditioner (4), which is arranged behind the mower bar (3), as seen in the material flow direction of mowed crop, and which has an upper conditioning roller (5) and a lower conditioning roller (6),
  - wherein the lower conditioning roller (6) is rotatable about a lower, positionally fixed axis of rotation (8),
  - wherein the upper conditioning roller (5) is rotatable about an upper, shiftable axis of rotation (9) in such a manner that, as a result of shifting the upper axis of rotation (9) relative to the lower axis of rotation (8), a gap (7) between the conditioning rollers (5, 6) is changeable, characterized in that
the lower conditioning roller (6) and the upper conditioning roller (5) are coupled to each other via a scissors-like transmission (10), wherein a first transmission part (11) is coupled to the lower conditioning roller (6) and a second transmission part (12) is coupled to the upper conditioning roller (5), wherein the transmission parts (10, 11) are operatively connected to each other with an intermediate shaft and are shiftable in a scissors-like manner with respect to each other, the intermediate shaft having a scissors axis (19) that is movable within a plane orthogonal to the scissors axis (19).

12. The mower according to claim 1, characterized in that the upper conditioning roller (5) is connected only to the second transmission part (12).

13. The mower according to claim 12, characterized in that the upper conditioning roller (5) is connected to the second transmission part (12) by the flange 14.

* * * * *